United States Patent
Stippler et al.

(10) Patent No.: US 6,968,773 B1
(45) Date of Patent: Nov. 29, 2005

(54) VESSEL AND WORT PROCESSING METHOD FOR PRODUCING BEER

(75) Inventors: Kurt Stippler, Marzling (DE); Klaus-Karl Wasmuht, Ellingen (DE)

(73) Assignee: Anton Steinecker Maschinenfabrik GmbH, Freising (DE)

(*) Notice: Subject to any disclaimer, the term of this patent is extended or adjusted under 35 U.S.C. 154(b) by 0 days.

(21) Appl. No.: 09/719,847

(22) PCT Filed: Dec. 14, 1998

(86) PCT No.: PCT/EP98/08185

§ 371 (c)(1), (2), (4) Date: Apr. 9, 2001

(87) PCT Pub. No.: WO00/00583

PCT Pub. Date: Jan. 6, 2000

(30) Foreign Application Priority Data

Jun. 26, 1998 (DE) ................. 198 28 686

(51) Int. Cl.$^7$ ................................ C12C 7/28
(52) U.S. Cl. ................ 99/278; 99/288; 99/289 R
(58) Field of Search ............. 99/278, 288, 289 R; 426/16

(56) References Cited

U.S. PATENT DOCUMENTS

| | | | |
|---|---|---|---|
| 2,250,777 A | | 7/1941 | Schock |
| 4,550,029 A | * | 10/1985 | Kruger et al. ............ 426/487 |
| 4,836,097 A | * | 6/1989 | Tretter ..................... 99/277.1 |
| 5,522,305 A | * | 6/1996 | Widhopf ..................... 99/276 |
| 5,865,093 A | * | 2/1999 | Wasmuht et al. ............ 99/278 |

FOREIGN PATENT DOCUMENTS

| | | | |
|---|---|---|---|
| DE | 548187 | | 4/1932 |
| DE | 538073 | | 4/1933 |
| DE | 1 055 482 | | 4/1959 |
| DE | 2535121 | * | 2/1977 |
| DE | 30 18 111 | | 11/1981 |
| DE | 19539509 | | 11/1996 |
| GB | 129549 | | 11/1918 |
| GB | 498081 | | 1/1939 |
| HU | P 9201446 | | 1/1994 |
| WO | 98/15612 | * | 4/1998 |

* cited by examiner

*Primary Examiner*—Keith Hendricks
(74) *Attorney, Agent, or Firm*—Marshall, Gerstein & Borun LLP

(57) ABSTRACT

A vessel and a method for thermally treating wort in beer brewing, wherein a wort guiding screen or cone is placed inside the vessel and a feed pipe ending above the wort guiding screen or cone is used to discharge wort from above onto the wort guiding screen or cone. The wort boiling method has the wort discharged onto an inclined, heated guiding surface from which it flows down and spreads into a sheet and is thereby heated.

8 Claims, 5 Drawing Sheets

FIG. 6 (Table)

| | | COOKING IN ACCORDANCE WITH THE INVENTION: | | | | NORMAL COOKING (NC): | | | |
|---|---|---|---|---|---|---|---|---|---|
| | | PF.-FULL | AW | STRIPPING/COOLANT | Δ | PF.-FULL | AW | STRIPPING/COOLANT | Δ |
| TBZ | | 21.3 | 27.9 | 27.6 | +8.3 | 26.9 | 43.2 | 50.6 | +23.7 |
| COLOR | EBC | 7.75 | 8.0 | 8.5 | +0.75 | 6.5 | 7.55 | 7.75 | +1.25 |
| ADDITIONAL COAG. N | Mg/100ml | 7.3 | 3.3 | 3.0 | -4.3 | 7.0 | 2.1 | 2.0 | -5.0 |
| DMS FREE | µg/l | 297 | 96 ↗ | 38 | - | - | 39 ↗ | 97 | |
| DMS PREC. | µg/l | 564 | 46 ↗ | 40 | - | - | 144 ↗ | 51 | |

VESSEL AND WORT PROCESSING METHOD FOR PRODUCING BEER

This application is a 35 U.S.C. §371 national stage of International Application no. PCT/EP98/08185, filed Dec. 14, 1998, and claims priority to German patent application 198 28 686.4, filed Jun. 26, 1998.

FIELD OF THE INVENTION

The present invention relates to a vessel and a method for thermally treating wort in beer brewing.

BACKGROUND OF THE INVENTION

As is generally known, in beer brewing the wort must be subjected to different treatment steps. Of importance here is the wort boiling process in which the wort obtained in the lauter process is boiled and hops are then added in some form or other. The boiling of wort aims at the evaporation of excessive water for obtaining the desired wort concentration, at the destruction of enzymes and at a sterilization of the wort, at an elimination of coagulable proteins and finally at a dissolution of the hop components, above all the bitter substances in the wort.

It is also known that the wort is subsequently passed to the wort kettle in a whirlpool tank to separate the hot break. The wort is kept in a hot state in the whirlpool tank. Finally, further possible treatment steps are the introduction of the wort downstream of the wort kettle into an expansion cooler in which the wort is cooled down to about 70° C. to 75° C. In the expansion cooler DMS (dimethyl sulphide) can be expelled, for instance, with the aid of a vacuum.

In all of these treatment steps the wort is thermally treated either by letting it cool down or by heating. Normally, internal or external tube boilers are used for heating purposes, with the wort being passed therethrough. For the purpose of expansion, i.e. for expelling aromatic substances from the wort, the suggestion has already been made that the wort should be passed from below against a deflection screen so that the wort spreads in fan-like fashion inside a vessel and can thus evaporate.

SUMMARY OF THE INVENTION

It is thus the object of the present invention to suggest a vessel and a method which can be employed at various stages of the wort treating process for an efficient thermal treatment of the wort.

For achieving said object the invention suggests a vessel which has arranged in its interior a wort guiding screen, as well as a feed pipe ending above the wort guiding screen for discharging wort from above onto the wort guiding screen.

It is possible with such a vessel to discharge wort, e.g. directly after the wort kettle, from above onto the wort guiding screen. The wort then flows along the surface of the wort guiding screen downwards, whereby it is distributed over a large surface so that it can cool efficiently and rapidly, or however when the wort guiding screen, as intended according to an advantageous development, is heatable, it can also be heated over a large surface, which permits an efficient heat transfer. Whenever mention is made herein of "in the interior", this does not rule out that the wort guiding screen itself may, at least to some extent, be part of the wall of the wort guiding screen.

When it is further stated herein that the wort is discharged from above onto the wort guiding screen, this includes that wort can be supplied through corresponding passages in the upper portion of the wort guiding screen or also as an overflow over an upper wort guiding surface.

According to an advantageous development of the invention, the free feed cross-section of the wort on the wort guiding screen is variable. In varying the feed cross-section it is possible to guide different amounts of liquid per time unit over the wort guiding screen so that the capacity of the vessel is variable. Said variation can be accomplished most easily by way of a vertically adjustable construction of the feed pipe, so that the opening of the feed pipe comes to rest above the wort guiding screen at a variable distance.

When the wort guiding screen is provided with a heating means, the wort can be heated or the cooling speed of the wort can be influenced when the selected temperature is below the discharge temperature of the wort. While the wort is being heated, as may e.g. be necessary when a pre-run vessel is used, a very efficient heat transmission is accomplished, resulting in a uniform heating process.

The heating means is preferably implemented such that the wort guiding screen is designed as a double-walled screen through the interior of which superheated steam or another heating medium can be guided. In this case the wort guiding screen is provided with connections for introducing superheated steam and with outlets for discharging the condensate.

In a very advantageous development, the wort guiding screen covers at least two thirds of the area of the vessel, i.e., the wort guiding screen has a large surface, thereby permitting a correspondingly efficient thermal treatment.

In a preferred development the wort guiding screen may be given a conical shape, with the tip of the cone being located on the center axis of the vessel normally provided with a round cross-sectional shape, and forming the discharge point for the wort. The wort is then distributed away from the tip over the whole conical surface and can thus evaporate or can be heated.

The angle of inclination of the wort guiding screen relative to the horizontal is preferably between 20° and 40°. Such a selected angle of inclination ensures on the one hand that the wort can flow off in a sufficiently easy way, and on the other hand that the flow-off rate is not too great in said portion, resulting in a sufficiently long rest or dwell time on the screen and thus in an adequate heat treatment possibility.

As already mentioned, the vessel can be used at various points for thermally treating wort in the course of the beer brewing process. For instance, it can be connected as an evaporation vessel (stripper) between a wort kettle or whirlpool (kettle) on the one hand and a plate cooler on the other hand. With such a use it serves to expel undesired aromatic substances, such as DMS, from the wort.

In another application, the vessel is combined as a pre-run vessel/kettle with a wort kettle. Such a pre-run vessel receives lautered wort amounts in the known way during wort boiling of the preceding brew. At high brew sequences it may then be necessary that the wort is heated in the pre-run vessel e.g. to 90° C. to 95° C. to free the wort kettle from this expenditure of time. The inventive vessel is also suited for this purpose if, as suggested, it is provided with a heating means. The diameter of the vessel may then also be adapted to a wort and/or whirlpool kettle in such a way that the vessel can be arranged above the kettle. In such a case there are pipe systems for permitting a pumping action from the vessel into the wort kettle and back.

Finally, it is also possible to use the vessel with its heating means as a wort kettle as such.

The vessel may also be combined with a pre-run vessel for heating the wort by way of pumping between pre-run vessel and wort kettle. Conventional wort boiling devices, such as external or internal tube boilers, are no longer needed. It has particularly been found that a very efficient heating up is possible when use is made of a vessel designed according to the invention with a guide surface over which the wort is guided over a large surface, i.e. in a thin layer, for heating purposes and that considerable amounts of energy are saved in comparison with conventional wort boiling systems.

The wort guiding screen can be implemented in different ways. In particular, it may be formed from guide surfaces that are superimposed in cascade-like fashion, or as a conical surface with a downward orientation of the cone tip. It would also be possible to design the wort guiding screen as a cylindrical surface on the inner circumference of which the wort is guided in the manner of a spiral to run downwards. The wort guiding screen within the meaning of the invention is thus to be understood as any inclined guide surface over which the wort can be guided for treatment, in particular for heating over a large surface, i.e. with a small layer thickness.

The wort guiding screen surface may preferably be corrugated or may have a waved structure—at least to some extent—for improving the transfer of heat. A structured surface of the wort guiding screen guarantees turbulent flow conditions, resulting in an even further improved heat transfer.

It has been found that considerable advantages in the technical process can be achieved with this kind of wort boiling. In comparison with conventional boiling methods the total evaporation could be reduced considerably, i.e. energy amounts of up to 60% can be saved. From the viewpoint of process technology, considerable improvements in the beers produced thereby are achieved with respect to the indicators regarding the heat load, the color, the DMS and the TBZ (thiobarbituric acid number) values.

Wort boiling is preferably carried out in two phases; in the first phase the wort is heated by being pumped over the heated guide surface, and in the second phase the boiling process is carried out by way of pumping over the heated guide surface. The boiling phase proper (second phase) may be followed, possibly after a rest phase, by a third phase in which the wort is stripped by pumping over the guide surface (evaporation of undesired aromatic substances). The method can thus be carried out such that the wort is guided for heating purposes and also for the boiling proper over a large surface over the same guide surface, which constructionally and from the viewpoint of process technology results on the whole in a simple overall wort boiling process.

In the first phase (heating up) the wort can be pumped with a larger pumping amount (wort amount per time unit) than in the second phase and thus be guided over the guide surface. In the third phase, in which stripping is performed, the pumping amount is preferably chosen to be smaller than in the first two phases.

The heat amount supplied to the guide surface, preferably in the form of superheated steam, may be chosen to be higher in the first phase than in the second phase. This can preferably be effected by a corresponding control of the heat amount supply, e.g. by adjusting different steam pressures or steam amounts.

It has been found that during performance of the method the layer thickness of the wort flow over the guide surface should be less than 20 mm, preferably between 1 and 10 mm. Preferred flow rates of the wort over the guide surface range from 0.2 m per second to 1 m per second. If the speed is too high, i.e. operation with steep angles of the guide surface, the heating surfaces would have to be provided with correspondingly large dimensions to ensure a sufficiently long dwell time of the wort on the guide surfaces for heating-up purposes. If the flow rate is too slow, the wort might be overheated.

BRIEF DESCRIPTION OF THE DRAWINGS

The invention shall now be explained and described in more detail in the following text with reference to the figures and a table.

FIG. 6 is the only table and shows a comparison between the values which can be achieved with the inventive method and those of a conventional method.

DETAILED DESCRIPTION OF THE PREFERRED EMBODIMENT

Figure 1:
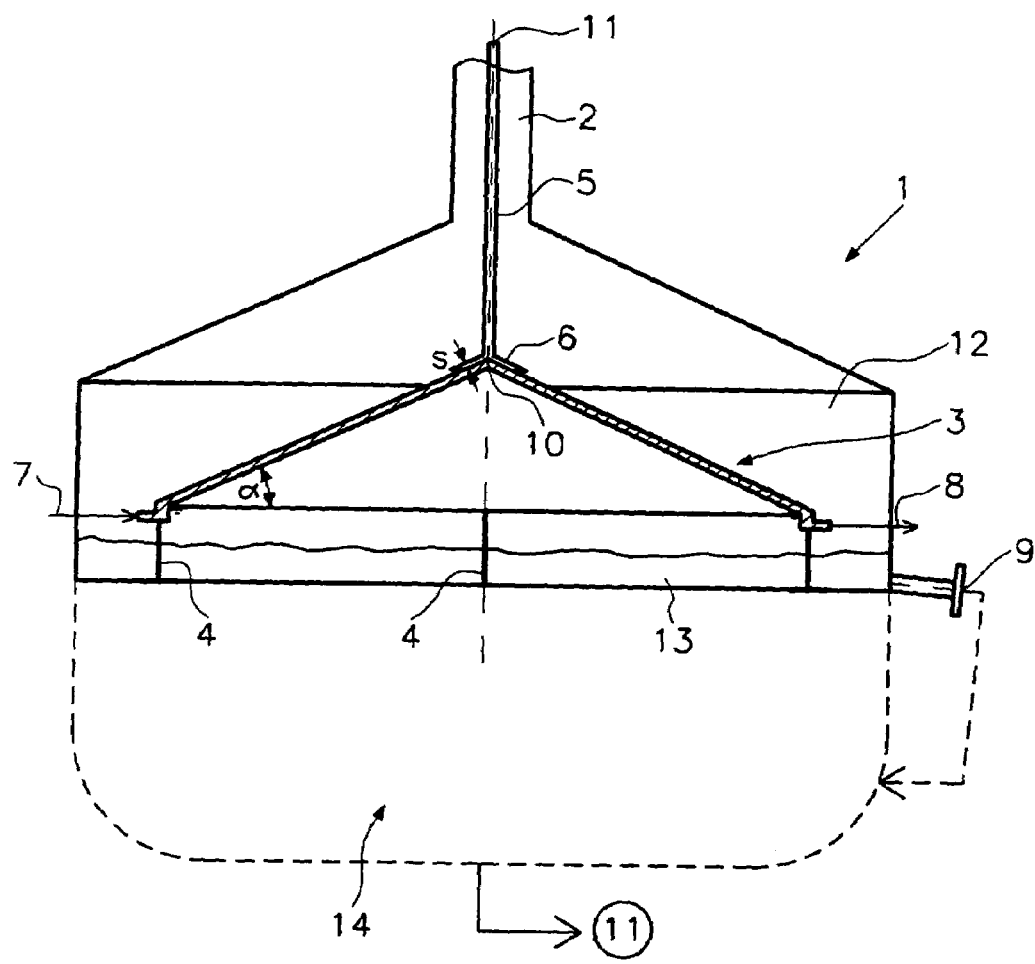
FIG. 1 shows a first embodiment of a vessel of the invention for treating wort.

The vessel shown in FIG. 1 is designated by 1 on the whole and comprises an upper part ending in a gas outlet 2, as well as an interior 12 which has arranged therein a wort guiding screen 3. The wort guiding screen 3 provides a conical surface which covers a considerable part of the bottom of the vessel, i.e. has a large surface. Said guiding screen is supported via support feet 4 on the bottom 13. The feed pipe 5 for the wort to be treated ends above the apex 10 of the wort guiding screen in an opening cone 6. The feed pipe is arranged to be vertically adjustable inside the vessel in a way not shown in more detailed, so that the free opening cross-section S can be varied between the wort guiding screen surface and the opening cone 6.

The angle of inclination a of the wort guiding screen 3 is between 20° and 40°.

In the illustrated embodiment, the guiding screen is designed as a double-walled guiding screen in the hatched interior of which steam channels are provided for the supply of superheated steam via a steam supply pipe 7. The condensate is collected and discharged through a condensate outlet 8. The wort collected below the wort guiding screen can be discharged via outlet 9.

The vessel constructed in this way can be used in various ways for treating wort. When it is used as a pre-run vessel or heat-keeping vessel, wort is supplied via inlet 11 directly from the wort kettle to the feed pipe 5. The feed cross-section S is suitably adjusted in accordance with the amount of wort to be processed, and the wort then passes via the conical surface of the wort guiding screen 3 to the bottom of the vessel. While flowing down on the conical surface the wort is heated up by superheated steam flowing through the guiding screen. The wort can then be heated to 90 to 99° C. and kept in the vessel. Optionally, a pump system may be provided that takes the wort out of the outlet 9 and feeds it back again via inlet 11 so that the wort can be heated or kept in a hot state in a circle.

The vessel, however, may also be arranged as an evaporation vessel upstream of, for instance, a plate cooler. The guiding screen is then used, without being heated, as a cooling surface. Thanks to the large surface created thereby, the fed wort can efficiently evaporate objectionable aromatic substances which can then escape via outlet 2. Optionally, the vessel may here be subjected to a slight negative pressure to improve the evaporation effect.

The vessel can be used not only as an independent, isolated vessel, but also as a combinable vessel mounted on a wort kettle, whirlpool or whirlpool kettle that is also shown in broken line in the drawing and provided with reference numeral 14. The diameters are then matched accordingly, and corresponding pipe systems are provided for bringing the vessels into flow communication with one another. For instance, the outlet of the lower vessel, which may e.g. be a whirlpool kettle, could be connected to the inlet 11, as illustrated, of the vessel arranged thereabove.

Figure 2:
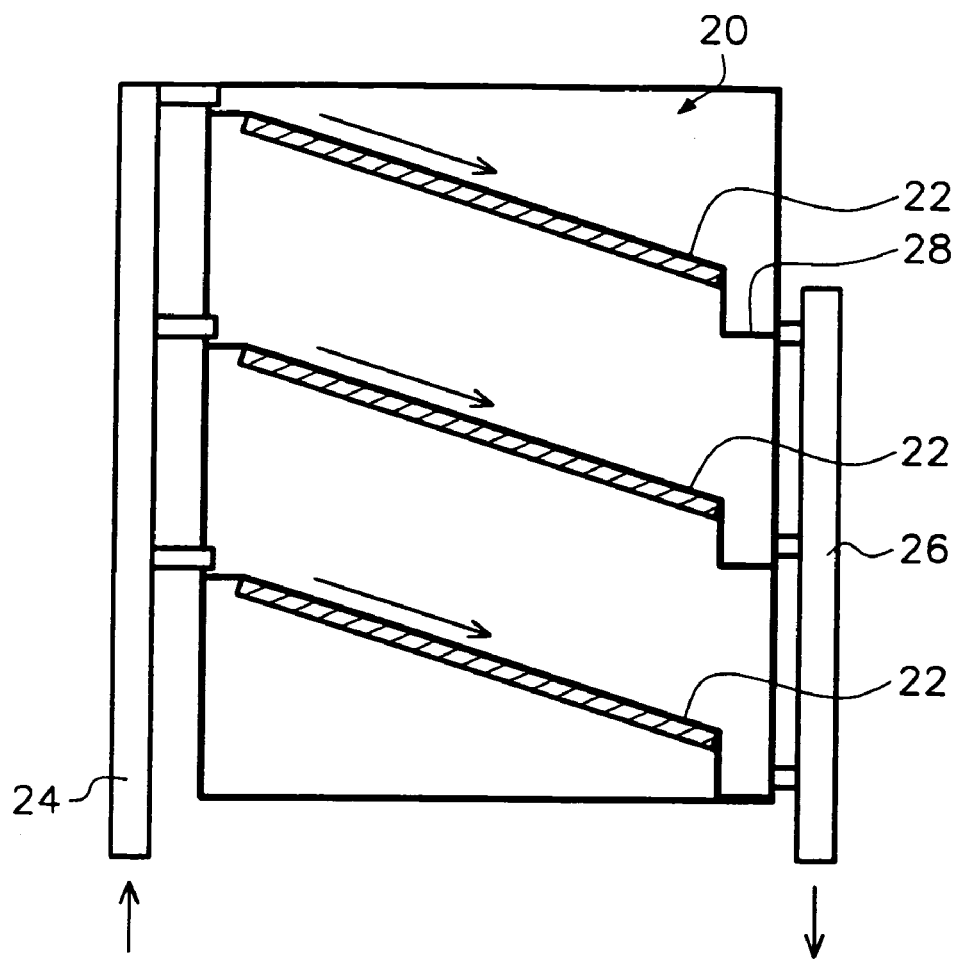
FIG. 2 is a schematic sectional view showing a second embodiment.

The wort guiding screen of the vessel can be implemented in various ways. In the embodiment shown in FIG. 2 the vessel is designated by reference numeral 20 on the whole. In the interior of the vessel, there are provided a plurality of wort guiding surfaces 22 which are superimposed in cascade-like fashion and are round or rectangular when viewed from the top (not shown) and which are double-walled and through which superheated steam can flow in the hatched interior, i.e. they can be heated. The wort to be heated passes via a supply distributor 24 onto the various guide surfaces 22, flows therealong and is thus heated and supplied via the collection channels 28 to a collection pipe 26 to be then moved e.g. to a pre-run vessel, depending on the respective use of the vessel, and to be optionally circulated by a pump until the desired treatment of the wort, in particular boiling, has been concluded.

Figure 3:
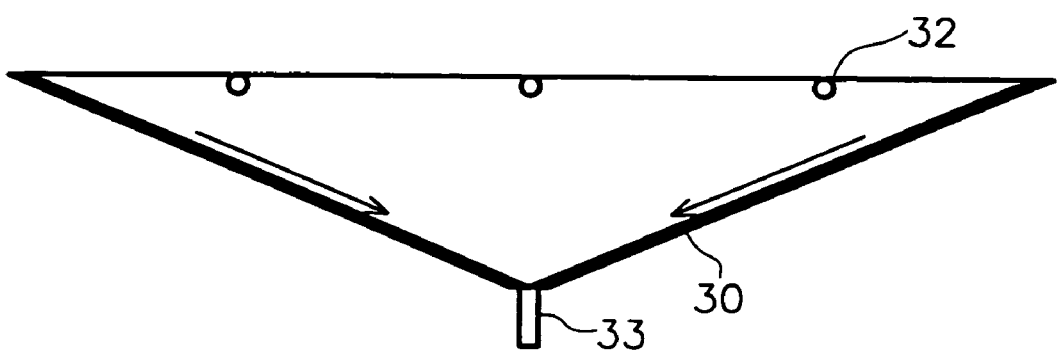
FIG. 3 is s schematic view showing a third embodiment of a wort guiding screen.

FIG. 3, in turn, shows another variant in which the wort guiding screen is designed as an inverted cone 30, also provided with double walls (not shown) for heating purposes. The feed pipe openings 32 are distributed over the circumference, thereby allowing the supply of wort. The openings may also be tangent to the inner surface, so that the wort passes in a spiral flowing motion downwards towards the outlet 33.

Figure 4:
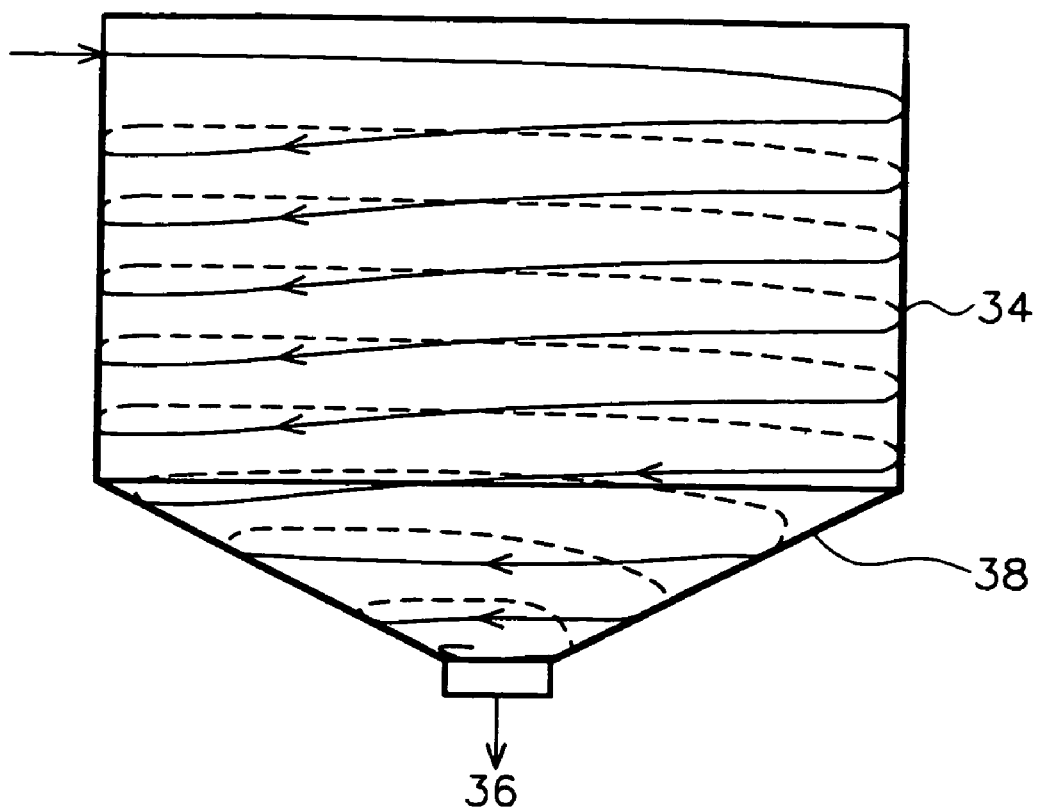
FIG. 4 is a schematic view showing a further embodiment of a wort guiding screen.

In the embodiment shown in FIG. 4, the wort guiding screen is designed as a cylinder with a subsequent, conically converging bottom part 38 (thus constituting the vessel itself), to the inner wall of which the wort flows in tangential fashion, so that it passes in the illustrated spiral movement to the outlet 36 into the tip of the cone. Thus, the wort guiding screen is designed in the fashion of a cyclone. Flow guiding plates which spirally extend downwards in a manner not shown in more detail and which serve as flow channels for the wort may be arranged along the wall. The wall is again of a double-wall type or spirally equipped with heating surfaces, so that it can e.g. be acted upon with superheated steam.

Figure 5:
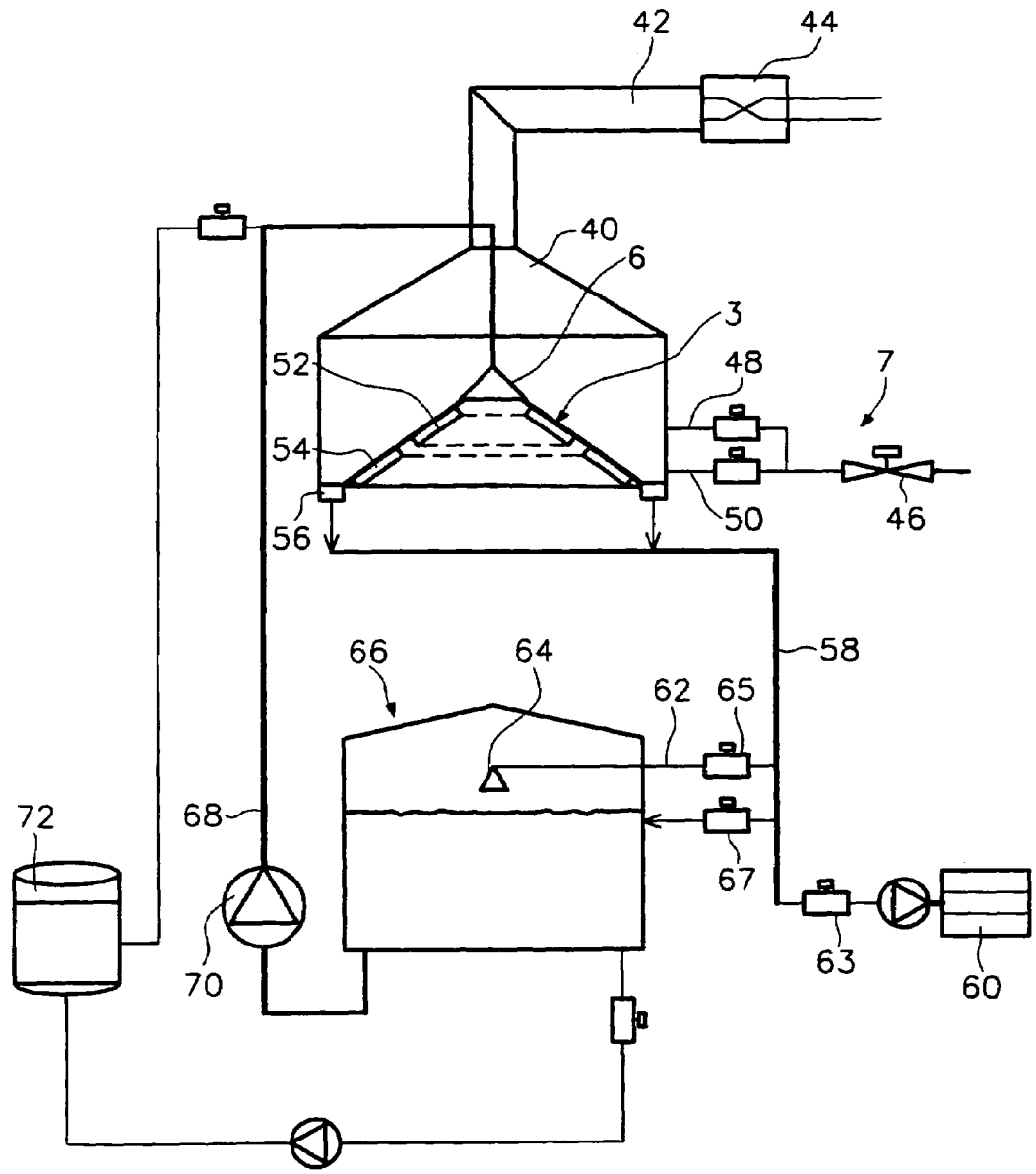
FIG. 5 shows the basic structure of a wort boiling system according to the invention.

With an inventively designed vessel it is possible to carry out an inventive method to obtain a complete wort boiling process with a system as is shown in FIG. 5. The inventive vessel serves as a wort kettle 40 which may have connected thereto in the conventional way a vapor exhaust pipe 42 and a kettle vapor condenser 44. The interior has arranged therein the heatable wort guiding screen 3 whose double wall in the illustrated example is connected into the vapor supply 7. The vapor supply 7 comprises an inlet valve 46 and two branches 48 and 50 arranged downstream thereof, which permit a selective heating of the two zones 52 and 54 of the wort guiding screen. Thus, in this embodiment, various areas of the wort guiding screen can also be subjected to different steam pressures and thus to different temperatures.

On the lower circumference of the wort guiding screen there is positioned a surrounding collection channel 56 which terminates in a pipe 58 leading to the plate cooler 60 for cooling the wort. Pipes 62 which lead back into the pre-run vessel 66 are branched off from pipe 58. Depending on the position of the valves 63 and 65 and 67, respectively, the wort can either be passed on to the plate cooler or back into the pre-run vessel. From the pre-run vessel the wort can be guided by means of a pump 70 and a pipe 68 back into the wort kettle 40 and can be discharged via cone 6 onto the wort guiding screen 3. Moreover, pipe 68 has connected thereto the hop dispensing vessel 72 for dispensing hops, the dispensing vessel being connectable to the circuit for dispensing hops.

In a concrete test carried out in practice, a wort guiding screen with an angle of inclination $\alpha$ of 25° and a diameter of 3.50 m was used at the lower end (maximum diameter) for wort boiling. For boiling a usual brew amount of 110 hl, which is fed from the lauter tun (not shown) into the pre-run vessel, the wort was circulated with the help of pump 70 for heating at a pumping amount of 500 to 550 hl per hour between the wort kettle 40 and the pre-run vessel 66. The wort guiding surface 3 was heated at a steam pr ssure of 1.6 to 2 bar. Within a period of 25 to 30 minut s the whole wort was thus heated from about 72° C. to 99° C. The evaporated amount was about 1 to 2 hl.

Said first heating phase was followed by a second boiling phase at a pumping amount of 400 to 430 hl per hour. The steam pressure was 1.0 to 1.5 bar. The wort was boiled within a period of time of 40 to 50 minutes. The total amount evaporated during boiling was 1.5 to 2.5 hl. The wort was subsequently left (to rest) in the pre-run vessel, which may also be designed as a whirlpool, for about 10 to 15 minutes.

The wort was then again pumped over the wort guiding surface 4, but at smaller pumping amounts of about 120 to 130 hl per hour. The steam pressure at which the wort was heated was 0.3 to 1.5 bar. This third stripping phase which serves, in particular, to expel the newly formed DMS (dimethyl sulfide) was carried out in accordance with the cooling time on the plate cooler for about 50 minutes. An amount of about 1 hl was evaporated.

The total evaporation amount was thus about 4.5 hl, which corresponds to an evaporation figure of about 4 to 4.1%.

In a concrete case, such a low overall evaporation saves a considerable amount of energy of 40 to 50% in comparison with conventional standard boiling using an internal boiler. An analysis of the beer boiled with the above-described method yielded values as are shown in the single table of FIG. 6. The TBZ value (thiobarbituric acid number) is indicative of the heat load. The smaller the increase, the better the flavor stability of the finished beer. Aged beers have also a greater flavor stability. In the method carried out according to the invention, there was an increase of only 8.3 units whereas the increase in the case of a comparable standard boiling with an internal boiler is 23.7 units. The color value which is approximately in parallel with the TBZ value is also more favorable than in standard boiling. A mere increase of 0.7 in comparison with 1.25 in standard boiling was detected.

The value of still coagulable nitrogen should be 1.5 to 2.5 mg/100 ml. Recently, however, values of >2.5 to 3.0 have been considered to be positive for the foam. The lower said value, the more intensive is the boiling process. It becomes also apparent in this case that the method of the invention achieves better values.

In the method of the invention, the free DMS value is very low at 96 μg/l in the case of an evaporation of 3.5 to 4% during boiling. Stripping (third phase) reduces the DMS value even further to 0.38 μg/l. During standard boiling from 39 to 97 this is caused by the DMS precursor decomposition during whirlpool rest.

Finally, the DMS precursor value is an indicator of the quality of the boiling process. The lower the value, the less DMS can freely form again. In this instance, too, the method of the invention exhibits better values.

A comparison with standard boiling, as has been explained here, was carried out with respect to a standard boiling method using an internal boiler (with a comparable amount of wort in the kettle), wherein the internal boiler was operated at 2.1 bar during filling for about 48 minutes. From the end of the filling operation to the beginning of the boiling process (12 minutes) the internal boiler was also operated at 2.1 bar. In the first boiling phase, boiling was carried out at 2 bar for about 28 minutes, followed by a rest time of 15 minutes at 98°. In the second boiling phase, which was also carried out at a steam pressure of 2 bar, the wort was boiled for 30 to 35 minutes, followed by a rest time of 15 minutes in the downstream whirlpool. The amount evaporated on the whole was more than 8 hl, i.e. the boiling process needed about 50% more energy than the method of the invention.

The vessel of the invention for treating wort and the method of the invention thus permit the conduction of a wort treating process, in particular a wort boiling process, in a novel way. The use of the vessel for heating and also for boiling and for stripping offers not only considerable advantages with respect to the quality of the beers that are producible thereby, but also saves a considerable amount of energy and simplifies the beer brewing systems from a constructional point of view.

We claim:

1. A vessel for treating wort in beer brewing, comprising in combination: a wort guiding screen (3, 22, 30, 34) arranged in an interior of the vessel and provided with a heating means, and a feed pipe (5) ending above said wort guiding screen (3) for discharging wort from above onto said wort guiding screen, said wort guiding screen (3, 22, 30, 34) being a double-walled screen through the interior of which a heating medium can be guided.

2. The vessel according to claim 1, wherein said wort guiding screen is cone-shaped.

3. The vessel according to claim 2, wherein the angle of inclination of said wort guiding screen relative to the horizontal is between 20° and 40°.

4. The vessel according to claim 1, wherein the wort vessel is connected as an evaporation vessel between a wort kettle and a plate cooler.

5. The vessel according to claim 1, wherein the wort vessel is combined as a pre-run vessel with a wort kettle.

6. The vessel according to claim 1, wherein the wort vessel (40) is preferably combined with a pre-run vessel (66).

7. The vessel according to claim 1, wherein said heating medium is steam.

8. The vessel according to claim 1, wherein the wort vessel is connected as an evaporation vessel between a whirlpool kettle and a plate cooler.

* * * * *